Patented Jan. 4, 1938

2,104,054

UNITED STATES PATENT OFFICE 2,104,054

BACTERIA-YEAST PROCESS OF BREAD MANUFACTURE

William L. Owen, Baton Rouge, La., assignor to The Lummus Company, New York, N. Y., a corporation of Delaware No Drawing. Application November 23, 1934, Serial No. 754,407

4 Claims. (Cl. 99—90)

This invention relates to a bread making process, methods of producing leavening agents, and the leavening agents themselves.

In modern methods of making leavened bread by the use of compressed yeast, the tendency has been to use sufficient yeast to complete the leavening in a minimum of time, without regard to the development of desirable flavors in the finished product. By restricting the leavening agency to compressed yeast entirely, and by adding such relatively large amounts of it, little chance is afforded for the development of such bacteria as are present in the flour, and consequently there are little if any ester or flavor substances developed in bakery bread.

Furthermore there is but little flexibility in the leavening process and the modifications in the standard procedure are limited to the following variations which may be classified as follows: (1) Reducing the amount of yeast by the use of so-called "sponge dough process", (2) Reducing the amount of yeast by the use of so-called "starters", and (3) Increasing the activity of yeast, by the use of yeast "activators", special yeast food, etc.

While all of these procedures are designed to reduce either the amount of yeast employed, or the time required for their leavening effect, none of them contemplate any contribution to the flavor of the bread itself.

It is an object of this invention to improve the commercial manufacture of bread by effecting economies in the process and materials used therein and by improving the ultimate product as to flavor and aroma.

There have been efforts made to produce a bread with a more distinctive flavor than can be obtained by the use of yeast as the exclusive leavening agent, but these efforts have been confined to the production of a "salt risen" type of bread, which is made with a heterogeneous mixture of mesophilic bacteria. The flavor while distinctive is not appealing to the average tastes, and the process lacks the flexibility that is incorporated in my own.

It is a further object of my invention to provide a bread mixing process which employs both a mesophilic, and a thermophilic gas producing species of bacteria, propagated in a special mash with corn meal as a basis, and various amounts of cane sugar added, as hereinafter described.

An additional object of my invention is the use of yeast, continuously propagated and acclimatized to a menstruum similar and almost identical with the composition of the dough in which it is to be employed. I have found that yeast so cultivated and acclimatized to the ingredients in dough, acquires much greater ability to induce a rapid and efficient fermentation of bread, and acquires more desirable leavening properties, than is possible where they are constantly propagated in a medium of foreign nature as is the case with compressed yeast.

I have found that by using a mixture of yeast so propagated, with cultures of bacteria carefully selected for their zymogenic powers both at ordinary and elevated temperatures, I have a most flexible process, by means of which I can obtain the following results, viz; (1) By mixing the dough, and proofing at the temperatures ordinarily employed I obtain a mildly flavored bread, with superior flavor, and more oven kick, than with the use of yeast alone. (2) By raising the temperature of mixing to 110° F. and proofing at ordinary temperature of 90°–100° F., I obtain a much more highly flavored loaf, with higher water absorption power, and less fermentation loss than with the ordinary yeasting process. (3) By mixing at 120°–130° F. and proofing at the same temperature I obtain, with the exception of the first 30 minutes after mixing, an exclusively bacterial leavening effect, with the yeast supplying the vitamin B to the bread, and a stimulating effect upon the added bacteria.

As the first step in the illustrative process there is isolated a culture of yeast from a sample of ordinary bakers' yeast by seeding the yeast into a medium of the following composition:

| | |
|---|---|
| Grain malt | 10° Brix solution |
| Cane sugar | (1 lb. to 5 gallons) 2.5% |
| Pot. phosphate | (.2 lb. to 5 gallons) .5% |
| Wheat flour | (1 lb. to 5 gallons) 2.5% |

This solution is sterilized in a suitable type yeast apparatus, consisting of an upper or seeding chamber, and a lower or fermenting chamber, both of which are supplied with steam and air spargers, and an air filtration arrangement by means of which sterile air can be supplied at all times. The yeast is introduced into the upper chamber, and after fermentation has begun, as evidenced by the evolution of gas from a gas outlet tube, the contents are discharged into the lower chamber, thoroughly mixed by aeration, and a recharging portion delivered to the seed chamber for further development. After the growth in the fermentation chamber has reached its maximum, which is usually from 6–10 hours, the contents are passed through centrifugal separators, and concentrated to the desired density of yeast cell content.

The selection of the yeast to be used is based upon (1) a primary test of their leavening power, in actual dough mixtures. (2) The retention of their leavening and reproducing powers as determined by repeated cycling through such an apparatus as above described.

I have found, for example, that it is easy to keep a culture of yeast indefinitely at its maximum efficiency by the operation above described. Furthermore, I have found that by growing the yeast continuously in a medium containing flour, as well as malt and cane sugar, that the leavening activities in dough are increased.

Having prepared the yeast as above described, it is necessary to have some standard for the unskilled operator to determine the relative amount of yeast cells present in a unit volume of the yeast suspension. This can be readily done by microscopical analysis, as I have found that a suspension containing as high a concentration of yeast as 500,000,000 per c. c. is sufficient for use directly in the dough. But recognizing the fact that the average bakery operator is unskilled in microscopy, I have found that accurate results may be obtained by the following procedure; a dilution of one gram with 30 ccs. of water is made of a sample of compressed yeast, and this is introduced into a tube, and well shaken. Into a second tube of identical size, there is introduced sufficient of the yeast suspension made as above described, to give a solution of the same turbidity as that of the compressed yeast sample used as a standard. From this comparison the approximate number of yeast in the suspension can be fairly accurately determined, as well as the amount of the suspension that will correspond with a definite weight of compressed yeast. In selecting a compressed yeast for these comparisons, it is necessary, of course, to take one which contains no starch.

Having obtained, in the above described manner, an active yeast culture and one whose fermentation efficiency can be maintained continuously under the above treatment, I next isolate a culture of mesophilic bacteria, of the *Clostridium butyricum* type, by making a 10% infusion of corn meal, and maintaining this at a temperature of 40° C. under semi-anaerobic conditions, (in deep layers) where the admission of air is reduced to the minimum. After gas formation begins, portions of this material are again transferred to successive portions of mash of the same composition, which have previously been sterilized at 15 lb. pressure. When gassing takes place here, portions of this are transferred to sterile agar plates and the bacteria isolated in pure culture, and maintained for future use.

Having now obtained cultures of the yeast, and the mesophilic gas producing bacteria, desired for the use as leavening agent, I proceed to the isolation of the thermophilic gas producers, which is accomplished as follows:

I have found that such organisms occur in both cane and beet sugars, and have found that one of these bacteria isolated from that source is of exceptional value as a leavening agent. I grow this organism is a solution containing cane sugar, and malt of the following composition;

| | Percent by weight |
|---|---|
| Corn meal mash | 5 |
| Cane sugar | 5 |
| Malt syrup | 2.5 |
| Wheat flour | 1 |
| Sodium chloride | .5 |
| Calcium phosphate | .5 | incubated at 130° F.

I propagate both of these cultures in an apparatus as described in the preceding section, in connection with the description of the propagation of yeast. The small or seeding chamber is inoculated wtih both cultures of the above described bacteria, the temperatures maintained first at 104° F. for three hours, then raised to 130° F. where it is kept for the remainder of the fermentation period, and until the bacteria are discharged from the apparatus. I have found that the concentration of the organisms are sufficient after a period of from 10–15 hours incubation.

Having obtained the desired cultures of both bacteria and yeast, in the desired concentration I proceed as follows:

I may combine the yeast and bacterial culture in a compressed yeast mass, by filtering the yeast suspension, in an ordinary plate and frame press, and after a cake of approximately one-fourth of an inch has been built up, I add an equal volume of the bacterial culture to the yeast suspension and filter the combined mixture, thus forming a compressed mass of the two organisms. This compressed bacteria-yeast mixture may be saved for further use, as a reserve supply, or may be shipped to the bakeries as may be required. I have found its keeping qualities to equal that of ordinary bakers' compressed yeast.

The usual procedure however, will be to use the liquid culture mixture in the bakery directly as it is produced, and for this purpose I proceed as follows:

The concentrated yeast culture after leaving the centrifugal separator is piped directly to a mixing tank provided with a mechanical stirrer and a gauge glass to determine its volume. The bacterial culture is in a similar manner piped to a receiving tank, from which it is conveyed to the yeast tank and mixed in the proportions that may be desired. From here it is piped directly to the mixers as required.

I have found that the best proportions to use where a mildly flavored bread is desired is an equal volume of both cultures, and a mixing temperature as ordinarily practiced. By raising the ratio of bacteria to yeast to two to one, and mixing at the above temperatures, I obtain a more highly developed flavor than in the previous case. By using a ratio of one to one, and mixing at 120°–130° F., I obtain a much more pronounced flavor, and a corresponding reduction in weight loss from fermentation. When mixing at this temperature, the function of the yeast becomes primarily as follows: (1) To supply an anaerobic condition of the bacteria, (2) To stimulate the latter by what is known as an alleocatalytic effect, that is, the stimulating action of one microbial cell upon another in the same environment, (3) To supply vitamins to the bread itself.

The above described yeast bacterial leavening agent has been successfully used in the production of bread according to the following formula:

| | Grams |
|---|---|
| Flour | 360 |
| Water | 216 |
| Salt | 7.20 |
| Sugar | 10.80 |
| Malt | 5.40 |
| Milk | 16.00 |
| Lard | 16.00 |
| Yeast | 11.80 |
| Yeast food | 1.80 |

The above ingredients are mixed at 110° F. and the dough is then proofed at a temperature of 130° F. It has been found that the time required for this "proofing" averages about 30′ and the bread under the microscope shows many of the charactertistic bacterial cells, and very few actively budding yeast. The resultant bread has an excellent flavor and aroma and is of excellent texture. Furthermore it loses less weight from fermentation than bread made by the ordinary compressed yeast process. I have found moreover, that a great advantage of the process, is that the bread has a much better keeping quality and resists staleness for twice as long periods as the ordinary bakers' bread.

If it is desired to distribute and transport the bacterial cultures from one point to another, I have found that the compressed bacteria-yeast mass, is an ideal form in which to ship them, as the yeast cells tend to prevent desiccation of the bacteria, and keeps them in an active condition.

Where it is desired to make bread by the use of "sponge" doughs the bacteria-yeast process works just as effectively as it does on "straight" doughs. With the former I use approximately one-half of the volume that is indicated in the latter process, and the "sponge" can be maintained in a special "fermenting chamber" where a temperature of 110° F. can be maintained, or if the mildly flavored bread is desired the fermentation can be carried out at room temperatures.

What is claimed is:

1. A bacteria-yeast process of bread manufacture comprising, continuously propagating a yeast culture which retains its leavening and reproducing powers through repeated cycling, simultaneously acclimatizing the yeast culture to a menstruum similar in composition to the composition of the dough in which it is to be employed, isolating a culture of mesophilic bacteria of the *Clostridium butyricum* type in a cereal infusion under semi-anaerobic conditions, isolating a thermophilic gas producing bacteria incubated at temperatures near 130° F. in a sugar solution, mixing the yeast culture and the bacterial cultures at a temperature in excess of 100° F. and thereby causing the yeast to stimulate the bacterial cultures in an alleocatalytic effect, combining the mixed leavening agent with flour and other bread constituents at a temperature above 100° F. to form a dough, proofing the dough at a temperature above 100° F. and, baking the dough.

2. The method of making bread including the steps comprising, continuously propagating a yeast culture which retains its leavening and reproducing powers through repeated cycling, simultaneously acclimatizing the yeast culture to a menstruum similar in composition to the composition of the dough in which it is to be employed, isolating a culture of mesophilic bacteria of the *Clostridium butyricum* type in a cereal infusion under semi-anaerobic conditions, isolating a thermophilic gas producing bacteria, and mixing the yeast culture and the bacterial cultures and thereby causing the yeast to stimulate the bacterial cultures in an alleocatalytic effect and produce the leavening agent.

3. A bacteria-yeast process of bread manufacture comprising, continuously propagating a yeast culture which acquires increased leavening and reproducing powers after repeated cycling, simultaneously and continuously acclimatizing the yeast culture to a menstruum similar in composition to the composition of the dough in which it is to be employed, preparing a culture of mesophilic bacteria of the *Clostridium butyricum* type in a cereal infusion under semi-anaerobic conditions and by continuous cycling, preparing by continuous cycling a thermophilic gas producing bacteria, withdrawing and mixing portions of the yeast culture and of the bacterial cultures at a temperature at least as high as 85° F. and thereby causing the yeast to stimulate the bacterial cultures in an alleocatalytic effect, periodically combining the mixed leavening agent with flour and other bread constituents at a temperature above 100° F. to form a dough, proofing the dough at a temperature above 100° F., and baking the dough.

4. A bacteria-yeast process of bread manufacture which comprises propagating an acclimatized yeast culture in a liquid menstruum containing flour and similar in composition to the composition of the dough in which it is to be employed by cyclically introducing to fresh portions of menstruum and withdrawing portions of utilized menstruum with the yeast culture therein, similarly propagating an acclimatized culture of mesophilic bacteria of the *Clostridium butyricum* type in a cereal infusion under semi-anaerobic conditions at a temperature of approximately 40° C. by cyclically introducing to fresh portions of the cereal infusion and withdrawing portions of utilized infusion with the mesophilic bacteria therein, similarly propagating an acclimatized culture of thermophilic gas-producing bacteria from sugar at approximately 130° F. in a liquid substrate similar in composition to that of the dough in which it is to be employed by cyclically introducing to fresh portions of the substrate and withdrawing portions of utilized substrate with the thermophilic bacteria therein, mixing the yeast and bacteria of the withdrawn portions in a ratio of one part of yeast with one to two parts of the bacteria and at a temperature of 100–130° F., combining the mixture with flour, sugar and other bread ingredients at a temperature of 100–130° F. to form a dough, proofing the dough at a temperature of 100–130° F. for about thirty minutes, and baking the dough.

WILLIAM L. OWEN.